Dec. 8, 1959    R. E. CROSSLEY    2,916,610
CEILOMETER PROJECTOR
Filed July 18, 1957    6 Sheets-Sheet 1

INVENTOR.
ROYAL E. CROSSLEY
BY D. Emmett Thompson
Attorney

Dec. 8, 1959   R. E. CROSSLEY   2,916,610
CEILOMETER PROJECTOR

Filed July 18, 1957   6 Sheets-Sheet 2

INVENTOR.
ROYAL E. CROSSLEY
BY

Dec. 8, 1959  R. E. CROSSLEY  2,916,610
CEILOMETER PROJECTOR

Filed July 18, 1957  6 Sheets-Sheet 4

INVENTOR.
ROYAL E. CROSSLEY
BY D. Emmett Thompson
Attorney

Dec. 8, 1959     R. E. CROSSLEY     2,916,610
CEILOMETER PROJECTOR

Filed July 18, 1957     6 Sheets-Sheet 5

INVENTOR.
ROYAL E. CROSSLEY
BY D. Emmett Thompson
Attorney

Dec. 8, 1959 R. E. CROSSLEY 2,916,610
CEILOMETER PROJECTOR
Filed July 18, 1957 6 Sheets-Sheet 6

INVENTOR.
ROYAL E. CROSSLEY
BY D. Emmett Thompson
Attorney

United States Patent Office 2,916,610
Patented Dec. 8, 1959

2,916,610

CEILOMETER PROJECTOR

Royal E. Crossley, Syracuse, N.Y., assignor to Crouse-Hinds Company, Syracuse, N.Y., a corporation of New York Application July 18, 1957, Serial No. 672,753

2 Claims. (Cl. 240—49)

This invention relates to systems used at airports, and the like, in connection with aviation to determine "ceiling" altitudes. As is well known to those familiar with the art, these systems are made up of three components, a projector, a receiver, and a computor, which computes data transmitted to it by the projector and receiver to give an automatic ceiling altitude determination.

Prior to this time, mercury arc lamps have been used in the projector due to the fact that the projector must project an intermittent beam having a predetermined frequency, and the receiver responsive only to reflections having the same frequency. Mercury arc lamps, however, develop a high degree of heat and hence suitable cooling apparatus, which is both costly and cumbersome, has to be incorporated in the projector. Consequently, attempts have been made to use high intensity incandescent lamps with a shutter arrangement in the projector to give the desired frequency to the light beam. High intensity incandescent lamps, however, are objectionable because they have a relatively short useful life due to the heat developed in the lamp by the concentrated filament.

Accordingly, it is an object of this invention to provide a ceilometer projector having an arrangement of parts whereby the useful life of the ceilometer projector lamp is increased.

In addition, it is an object of this invention to provide a new and useful shutter means for interrupting a continuous beam lamp in a ceilometer projector.

The invention consists in the novel features and in the combinations and constructions hereinafter set forth and claimed.

In describing this invention, reference is had to the accompanying drawings in which like characters designate corresponding parts in all the views.

In the drawings—

Figure 1:
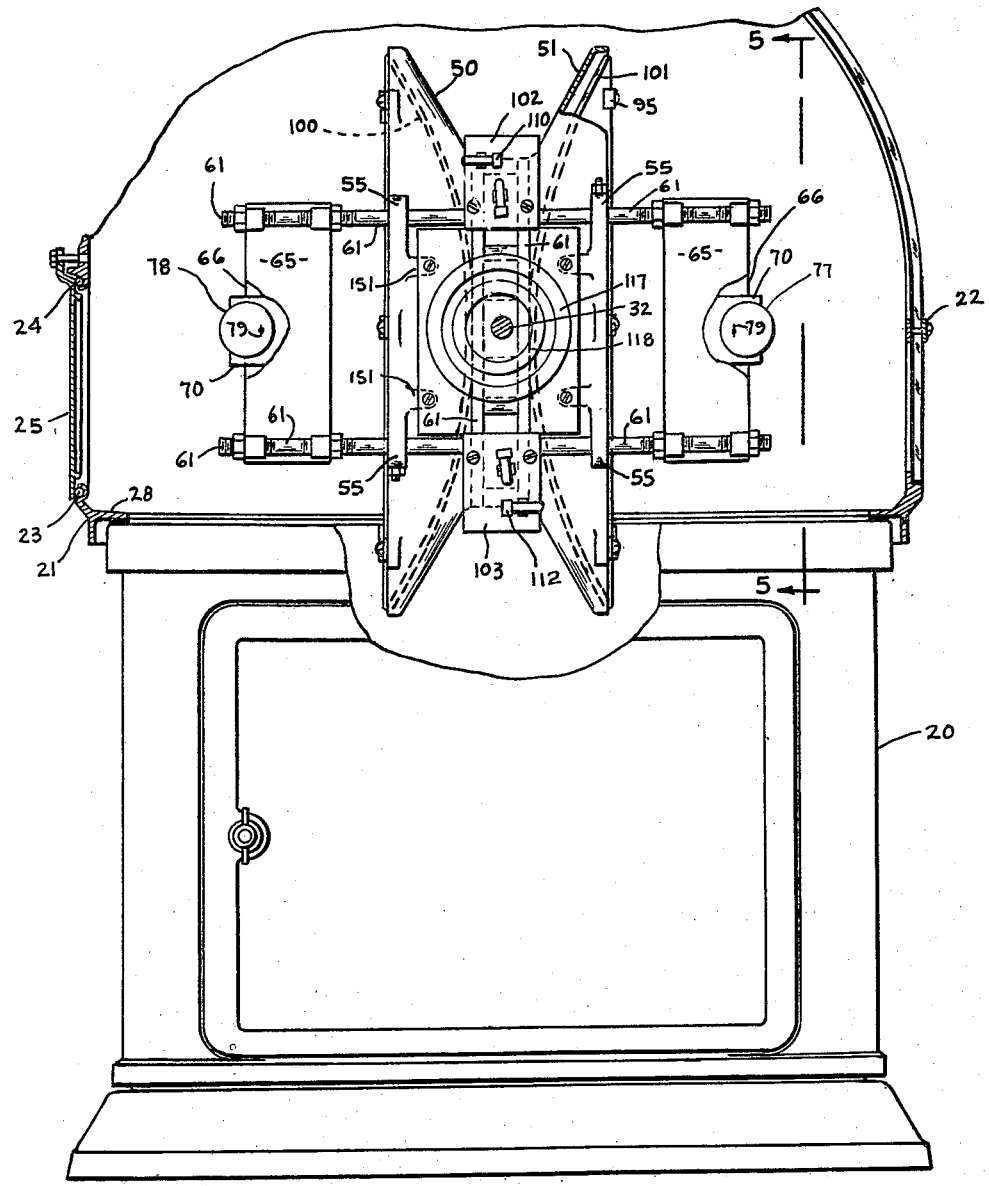
Figure 1 is an elevation shown partly in section of a projector embodying my invention.

With reference to Figure 1, it will be seen that the projector is made up of a cabinet 20 on which the projector chassis 21 is mounted, and a dome or cover 22, of transparent material, is pivotally mounted on the chassis 21, as at 23. The dome has a section hinged, as at 24, so as to provide an access door 25, which may be opened to provide access to relamp the projector.

Figure 4:
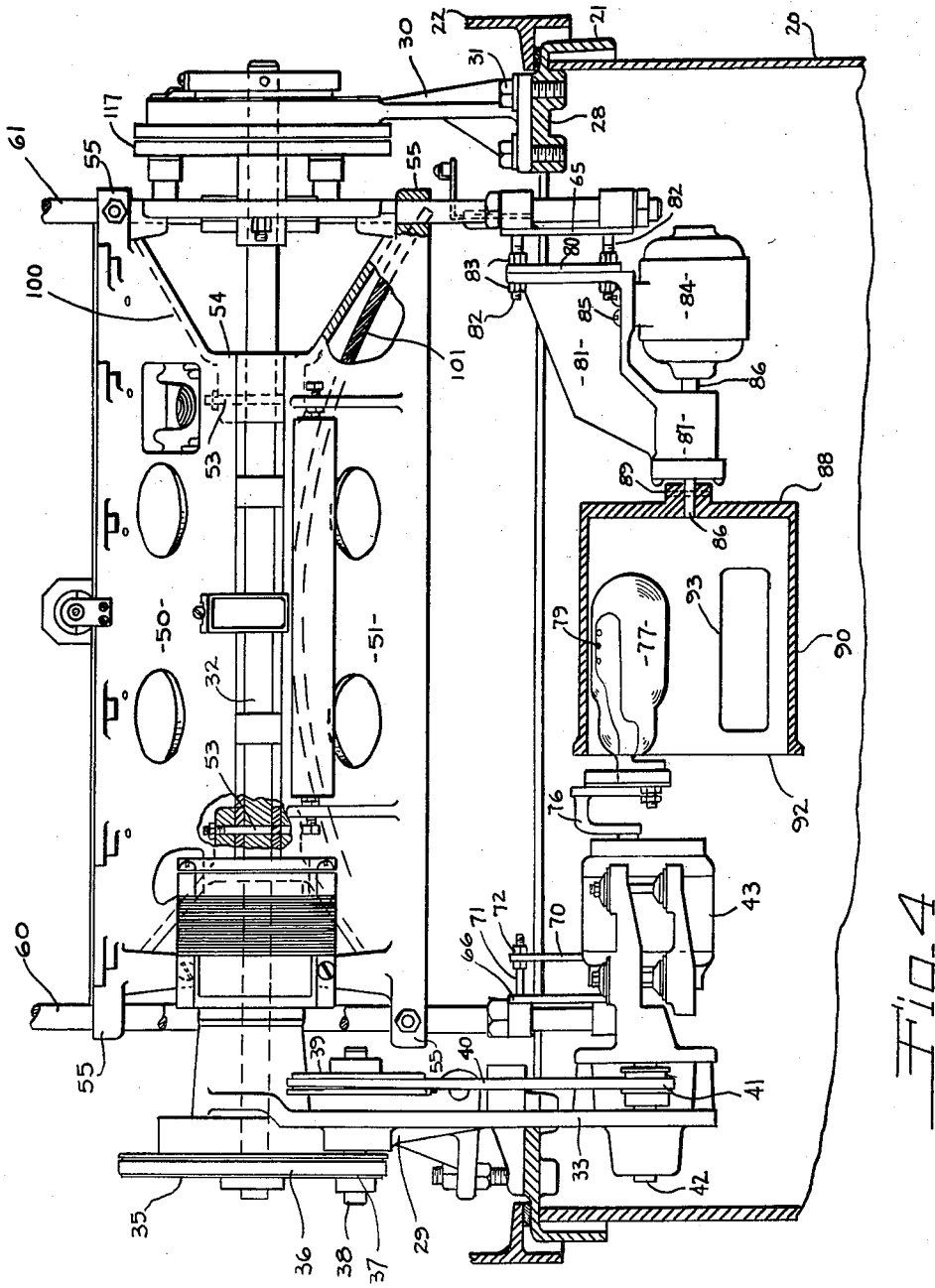
Figure 4 is a view, looking to the left, Figure 3, with parts broken away and parts in section.

With reference now to Figure 4, the chassis 21 has an inwardly extending flange 28 upon which suitable bearings 29, 30, are mounted at opposite sides of the chassis, as by fasteners 31. Journalled in the upper portion of the bearings 29, 30, is a shaft 32. The bearing 29 has a downwardly extending arm 33 forming a support for a motor to effect rotation of the shaft 32.

Figure 2:
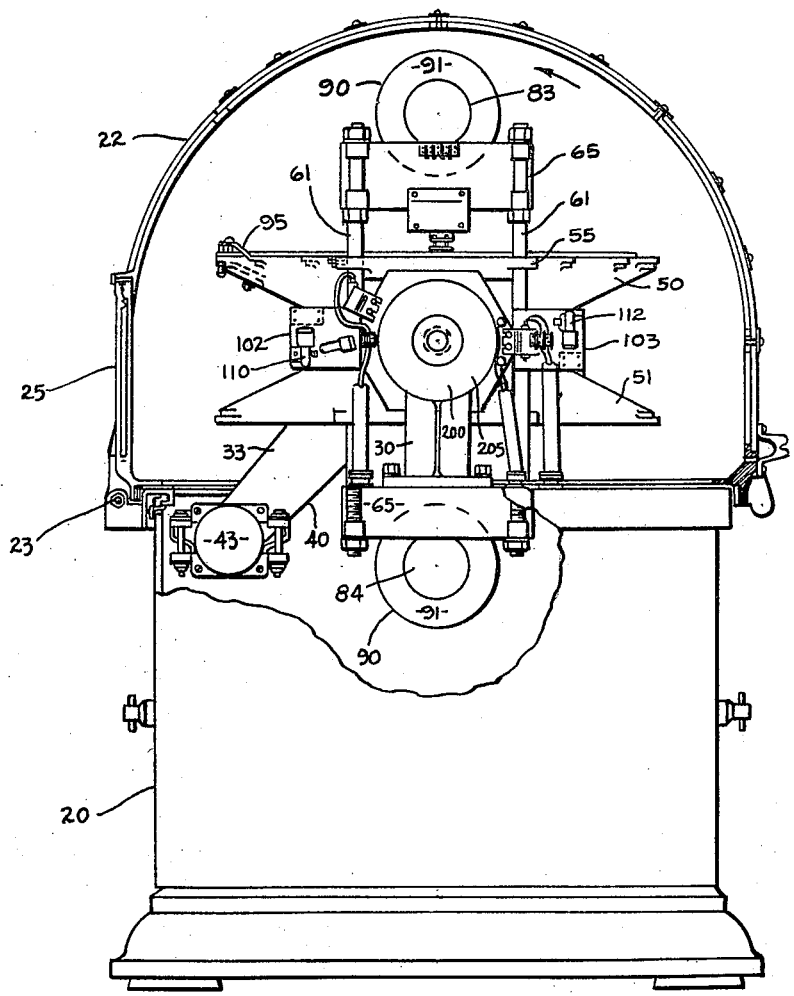
Figure 2 is a side elevation, shown partly in section and partly broken away, of the right-hand side of the projector with the reflector and lamp assembly rotated 90° from that shown in Figure 1.
Figure 3:
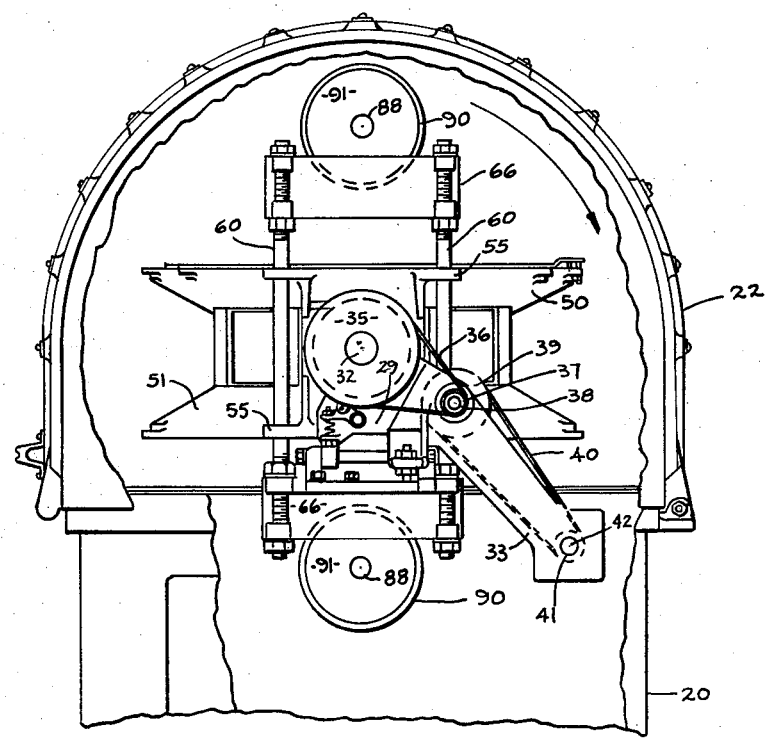
Figure 3 is a view, similar to Figure 2, of the left-hand side of the projector.

In the form of the invention illustrated in Figures 2, 3 and 4, the shaft 32 has a pulley 35 affixed to its left-hand end, and is connected by means of a belt 36 to a pulley 37 affixed to a shaft 38 journalled in the bearing bracket 29. A pulley 39 is affixed to the inner end of shaft 38 and is connected by a belt 40 to a pulley 41 mounted on the armature shaft 42 of a synchronous motor 43.

Figure 5:
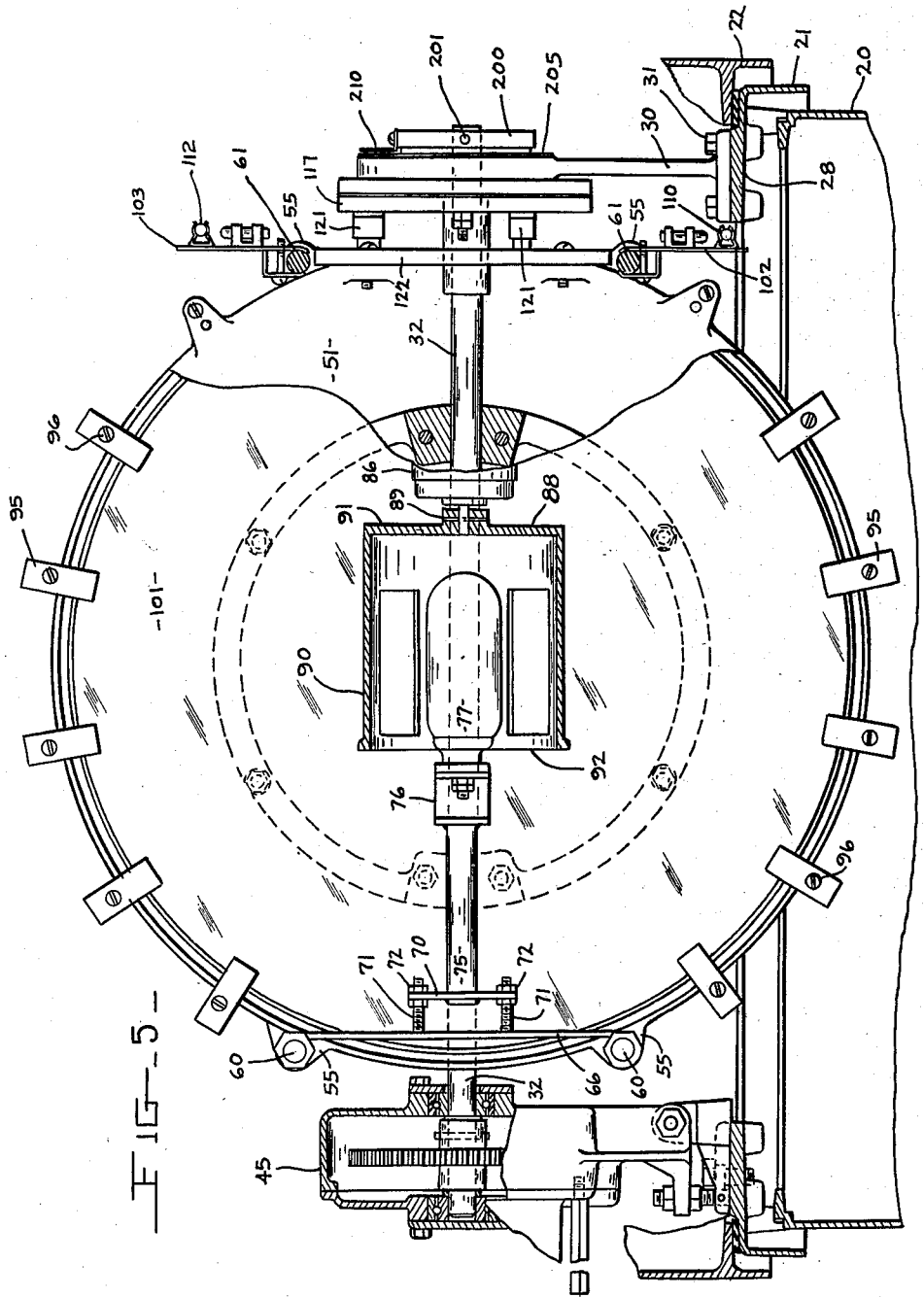
Figure 5 is a view, corresponding to line 5—5, Figure 1, and shows a modification of the drive for rotating the reflector and lamp assembly.
Figure 6:
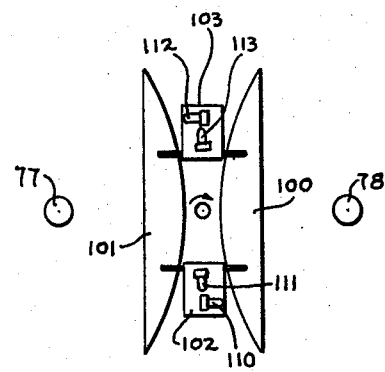
Figures 6, 7, 8 and 9, are schematic illustrations of the operation of the invention.
Figure 7:
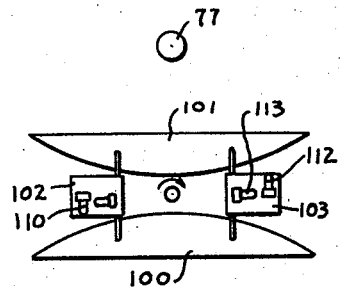
Figure 8:
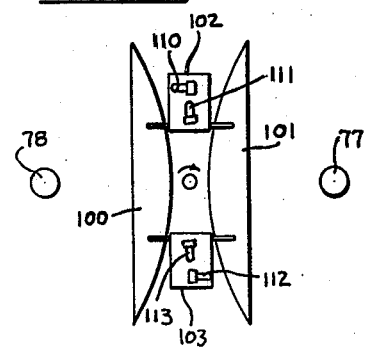
Figure 9:
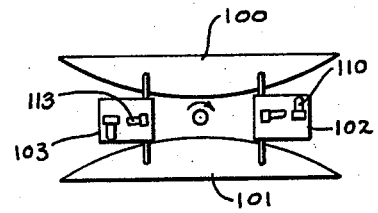

Referring now to the modification shown in Figure 5, the left-hand end of the drive shaft 32 is received in a gear box 45 which has a suitable connection to a motor, not shown. The only difference in the form of the invention shown in Figures 2, 3 and 4, and that shown in Figure 5, being the manner in which the central drive shaft 32 is driven.

Referring now to Figure 4, it will be seen that a pair of dish-shaped reflector brackets 50, 51, are mounted, in back to back relation on opposite sides of the shaft 32, by fasteners 53 which extend through bosses 54 formed on the reflector brackets. Each reflector bracket is formed on the periphery thereof, and at opposite sides of the axis thereof, with a pair of bosses 55. A pair of rods 60 are mounted in complemental bosses 55, and a pair of rods 61 are mounted in the bosses 55 at the opposite sides of the brackets 50, 51, the rods 60, 61 extending outwardly beyond the brackets 50, 51.

As will be seen from Figures 1, 2 and 4, there are adjustably mounted on the outer ends of the arms 61 a pair of mounting plates 65. On the outer ends of the arms 60, see Figures 3 and 4, are a pair of mounting plates 66. As will be seen from Figures 4 and 5, an adjusting plate 70 is mounted on each of the plates 66 by means of a plurality of threaded studs 71 and nuts 72. Affixed to each of the plates 70 is an arm 75 which has a goose neck 76 at its inner end, and incandescent lamps 77, 78, are mounted on the goose necks 76. Suitable power connections to the lamps 77, 78, are provided but have not been shown in these figures. Due to the fact that the plates 70 are adjustably mounted on the plates 66 which, in turn, are adjustably mounted on the arms 60, the lamps may be adjusted in two planes to position the lamps at the focal point of the reflectors carried by 50, 51.

Mounted on the mounting plates 65, carried by the arms 61, is a plate 80, see Figure 4, on which a motor supporting bracket 81 is mounted by means of a plurality of threaded studs 82, and nuts 83 therefor. A synchronous motor 84 is mounted on the bracket 81 by means of fasteners 85. The armature shaft 86 of the motor 84 extends into a bearing 87 formed in the outer end of the bracket 81, and a shutter 91 is connected to the shaft by a pin 89. The shutter, called a "chopper," includes a cylindrical portion 90 closed at one end by the discoidal portion 88 and open at its outer end 92. The cylindrical portion 90 has a plurality of lengthwise extending slots 93 formed therein, for a purpose hereinafter described.

As will be seen from Figure 4, the cylindrical portion 90 of the choppers, or shutters, encircles each of the lamps 77, 78, with the filaments of the lamps 77, 78, positioned in close proximity to the wall 90 of the chopper toward the respective reflector so that the cut-off of the filament beam will be sharp.

Carried by each of the reflector brackets 50, 51, by a plurality of mounting fingers 95 affixed to the periphery of the brackets by fasteners 96 are reflectors 100, 101 (see Figure 5). The lamp 77 is so positioned to be at the focal point of the reflector 101, and the lamp 78 is positioned at the focal point of the reflector 100. Also, the motor bracket 80 is adjustably mounted on plate 65 in order that the choppers 87 may be adjusted whenever the lamps have been adjusted.

As shown in Figures 1 and 2, the rods 61 have a pair of switch plates 102, 103, mounted thereon between the reflector carrying brackets 50, 51. A pair of mercury switches 110, 111, are adjustably mounted on the plate 102, and a like pair of switches 112, 113, are adjustably mounted on the plate 103. The reflector lamp assembly is rotated by the motor 43 in a clockwise direction, Figures 1, 2 and 6 through 10. One switch of each pair, as switches 110, 112, are disposed substantially parallel to the axes of the reflectors 100, 101, and the other switch of each pair is disposed in angular relation to the other switch of the pair.

Figure 10:
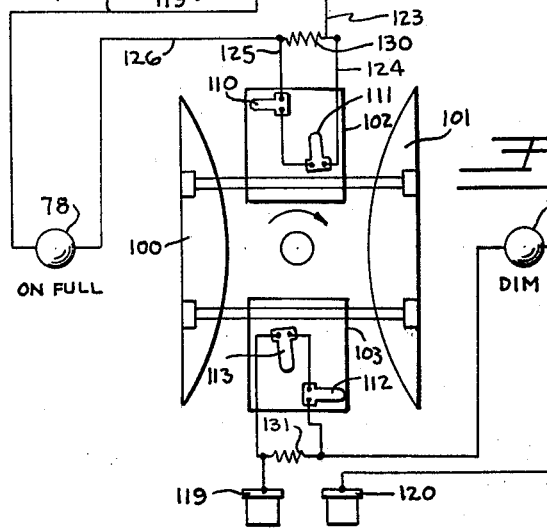
Figure 10 is a schematic illustration showing the wiring diagram of the invention.

Power is supplied for the lamps 77, 78, by leads 115, 116, connected to brushes 117, 118, which bear upon concentrically mounted slip rings 119, 120, see Figures 1 and 10. The slip rings are carried by suitable supporting members 121 mounted on a plate 122 fixed to the reflector brackets 50, 51. The switches 110, 111, are connected in series to complete a circuit from slip ring 120, through wires 123, 124, switch 111, switch 110, wire 125, wire 126, to lamp 78, through wire 128, to slip ring 119. The switches 112, 113, are connected in the same series arrangement to provide power from slip rings 119, 120, to lamp 77. A resistor 130 is connected in shunt with the pair of switches 110, 111, and in like manner a resistor 131 is connected in shunt with the pair of switches 112, 113.

As previously stated, in Figures 6 through 10, the reflector and lamp assembly is rotated in a clockwise direction. With the reflector assembly in the position shown in Figure 6—that is, with the axes of the reflectors extending horizontally, the switches 112, 113, are so positioned on the plate 103 that the contacts of both switches are bridged by the mercury. Accordingly, power is supplied to the lamp 77 at full line voltage and this condition prevails while the reflector and lamp assembly is rotated through a 90° arc to the position shown in Figure 7. However, upon further rotation of the assembly through an arc of relatively few degrees, the mercury of switch 113 moves out of bridging relation with the contacts of the switch and because the switches of this pair are connected in series, the circuit is broken through the switches and is thereafter maintained through the resistor 130. It will be understood by those familiar with ceilometer projectors of this type that the beam emitted by the projector is employed in determining the ceiling height of a cloud during the sweep of the beam from horizontal to vertical position. During this sweep of the beam, as illustrated by the diagrammatic views, Figures 6 and 7, the lamp 77 received full line voltage to create a beam of high intensity. The beam, of course, being intermittent at a frequency determined by the chopper 90. However, after the beam has passed the vertical point, the current supplied to the lamp is reduced by the resistor 130. This dimming of the lamp 77 prevails because of the arrangement of the switches 112, 113, until the reflector 101 reaches the position shown in Figure 6, at which time both of the mercury switches 112, 113, are closed to apply full line voltage to the lamp 77. Exactly the same situation prevails in regard to lamp 78 mounted at the focal point of the reflector 100.

With this arrangement, the lamps 77, 78, are automatically dimmed during the movement of the reflector-lamp assembly throughout an arc of approximately 260°. This permits the incandescent lamps to cool off during this substantial time period, thereby greatly increasing the life of the lamps.

What I claim is:

1. A ceilometer projector comprising a cabinet, a light projecting assembly rotatably mounted on a chassis carried by said cabinet, said assembly including a main shaft mounted for rotation on a horizontal axis, a reflector mounted on said shaft for rotation therewith in a circular path normal to the axis of revolution of the shaft, a lamp positioned at the focal point of said reflector, said lamp mounted for rotation in said circular path with said reflector, an apertured cylindrical chopper mounted on said assembly for rotation in said circular path with said reflector and said lamp, said chopper encircling said lamp in telescopic fashion and means for rotating said chopper at a constant speed whereby to give a predetermined frequency to the beam projected from said lamp and reflector, switch means mounted for rotation in said circular path with said assembly, said switch means being operable to dim said lamp during approximately three-quarters of each revolution of said lamp in said circular path.

2. A ceilometer projector as set forth in claim 1, wherein said switch means comprises a pair of mercury switches connected in series with each other and in shunt with a resistor, said resistor being connected in series with said lamp and a power source, said mercury switches being disposed approximately normal to each other so as to shunt said resistor during approximately one-quarter of each revolution of said assembly in said circular path whereby the lamp is dimmed during the remainder of each revolution.

References Cited in the file of this patent
UNITED STATES PATENTS

| | | |
|---|---|---|
| 1,486,731 | Cook | Mar. 11, 1924 |
| 2,122,921 | Sands | July 5, 1938 |
| 2,209,072 | Christensen | July 23, 1940 |
| 2,218,013 | Tice et al. | Oct. 15, 1940 |
| 2,345,517 | Weiss | Mar. 28, 1944 |
| 2,812,424 | Heugal | Nov. 5, 1957 |

FOREIGN PATENTS

| | | |
|---|---|---|
| 136,677 | Great Britain | Dec. 24, 1919 |